United States Patent [19]

Black

[11] Patent Number: 5,432,624
[45] Date of Patent: Jul. 11, 1995

[54] OPTICAL DISPLAY UNIT IN WHICH LIGHT PASSES A FIRST CELL, REFLECTS, THEN PASSES A SECOND CELL

[75] Inventor: Michael Black, Foster City, Calif.

[73] Assignee: Reliant Technologies, Inc., Foster City, Calif.

[21] Appl. No.: 161,246

[22] Filed: Dec. 3, 1993

[51] Int. Cl.⁶ ............... G02F 1/133; G02F 1/1335; G02F 1/03
[52] U.S. Cl. .................... 359/53; 359/70; 359/68; 359/247; 359/246
[58] Field of Search ............ 359/70, 40, 42, 48, 359/49, 53, 68, 63, 64, 66, 246, 247, 275, 277

[56] References Cited

U.S. PATENT DOCUMENTS

| | | | |
|---|---|---|---|
| 3,785,721 | 1/1974 | Harsch | 350/150 |
| 3,897,137 | 7/1975 | Dobbins | 359/70 |
| 3,924,932 | 12/1975 | Yamamoto | 359/63 |
| 4,006,968 | 2/1977 | Ernstoff et al. | 359/70 |
| 4,068,926 | 1/1978 | Nakamura et al. | 350/160 |
| 4,078,856 | 3/1978 | Thompson et al. | 350/362 |
| 4,232,948 | 11/1980 | Shanks | 350/347 |
| 4,239,349 | 12/1980 | Scheffer | 359/73 |
| 4,674,840 | 6/1987 | Bennett | 350/337 |
| 4,674,841 | 6/1987 | Buzak | 350/337 |
| 4,697,884 | 10/1987 | Am stutz et al. | 350/334 |
| 4,917,465 | 4/1990 | Conner et al. | 350/335 |
| 5,076,669 | 12/1991 | Black et al. | 359/63 |

FOREIGN PATENT DOCUMENTS 61-56319  3/1986  Japan ................ 359/63

Primary Examiner—William L. Sikes
Assistant Examiner—Kenneth Parker
Attorney, Agent, or Firm—David Pressman

[57] ABSTRACT

An optical color display unit is illuminated and operated with external light (36) consisting of the basic color components. The display unit uses a color-selective matrix (26) of color-selecting elements (28a, 28b, 28c, 42) to separate the incoming external light into its color components (36a, 36b, 36c) according to the refraction and diffraction principles of optics. After separating the light into its color components, the geometry of the color-selecting elements (28a, 28b, 28c, etc.) selectively reflects only one, predetermined color component. The colors of the individual color-selecting elements are chosen such that a color image can be displayed on the screen surface.

15 Claims, 5 Drawing Sheets

OPTICAL DISPLAY UNIT IN WHICH LIGHT PASSES A FIRST CELL, REFLECTS, THEN PASSES A SECOND CELL

BACKGROUND—FIELD OF THE INVENTION

The present invention relates to the field of electrooptics, and in particular to operating optical display units which employ light-sensitive elements.

BACKGROUND—DESCRIPTION OF PRIOR ART

One of the main fields in electrooptics includes optical display units for visualizing data and images, e.g. computer displays, visual indicators, viewing screens, etc. At the present time this area is dominated by liquid-crystal displays (LCDs) which use nematic crystals (crystals having a linear arrangement of molecules) to selectively pass or block polarized light in appropriate areas, so as to achieve the desired visual effect. Among the most successful LCDs are active-matrix displays as described in "Flat-Panel Displays" by Steven W. Depp and Webster E. Howard (Scientific American, March 1993, pp. 90–97).

In the meantime, methods have been developed to permit viewing images on LCDs in color. One example of a full-color LCD is described in U.S. Pat. No. 4,674,841 issued to Thomas S. Buzak on Jun. 23, 1987. Buzak presents a switchable color filter in conjunction with variable optical retarding elements, including a nematic liquid crystal cell as well as polarizers, to obtain three output colors. Each of these output colors is comprised of a mixture of at least two of the primary colors. Color images can be generated by selecting the appropriate colors from the available mixture of output colors.

Although this arrangement does produce an almost full-color image, it is not very efficient and requires many parts. In particular, it cannot function without a proper light source. Usually, this source of light is incorporated in the display, thus increasing its size, power requirements, and making the entire unit more prone to opto-mechanical or electrical damage. Another method for generating color images in conjunction with LCDs involves using the light valve principle. According to a method explained in "Full-color Subtractive Light Valve for Display Applications" by J. R. Trimmier et al. (The International Society for Optical Engineering, Vol. 1257, *Liquid Crystal Displays and Applications*, p. 95), a color LCD employs dichroic (two-color) guest/host LC cells to block complementary colors of incident white light. The dichroic liquid crystal cells containing neutral, cyan, magenta, and yellow dyes serve as filters which can be selectively activated to absorb (subtract) certain wavelengths of light (cyan absorbs wavelengths corresponding to red light, magenta absorbs green light, and yellow blocks blue light) to produce the desired color.

Besides the disadvantage of not being able to view the display at off-normal angles, this device also requires a source of white light, i.e., a background light source, which is expensive and increases power consumption of the LCD. This becomes a particularly serious problem when dealing with display screens of portable devices, especially battery-powered units, in which the amount of available power is relatively low. The result is a drastically shorter operating time. In general, light sources which illuminate screen displays are not capable of generating sufficiently bright images when the intensity of external light is very high, e.g., outdoors in broad daylight or in brightly lit rooms. Until now, the only solution to this problem has been to adjust the light source illuminating the display to its maximum power setting. Once again, this increases the energy consumption and, in case of battery powered units, severely limits the operating time.

In addition, using white light sources for illuminating displays makes it very difficult to achieve uniform brightness across the entire screen. This, in turn, renders it virtually impossible to guarantee a uniform variation of hues across the screen. However, since the human eye is very sensitive to small changes in hue, even small deviations in brightness and overall homogeneity of lighting contribute to inferior image quality.

Another system for obtaining a color LCD involves selectively blocking light of different wavelengths. Such a system is described in U.S. Pat. No. 5,076,699 issued to the inventor on Dec. 31, 1991. In this case a single color-sensitive filter is used in conjunction with an LC cell to selectively block different wavelengths of transmitted laser light. The display surface is subdivided into a matrix made up of fields or pixels. There are four different types of pixels: the first three are colored, preferably with the basic colors (red, green, blue), and one is colorless.

In general, all prior-art color displays which take advantage of selective blocking arrangements require a background light source. Consequently, they have the same disadvantages as the subtractive method, i.e., they exhibit excessive power consumption, limit screen size, and cannot be viewed at off-normal angles.

OBJECTS AND ADVANTAGES OF THE INVENTION

In view of the above, it is an object of the present invention to provide an optical display unit in which the brightness of the image increases with increasing intensity of external light.

Another object is to alleviate the problem of image loss at off-normal viewing angles.

Still another object is to enable considerable power savings, thus extending battery life in portable devices using optical display units.

Yet another object is to provide a color optical display unit which is very robust and thin.

These and other objects and advantages will become more apparent after consideration of the ensuing description and the accompanying drawings.

SUMMARY OF THE INVENTION

According to the invention, natural incident light from the surrounding environment is used to illuminate and operate an optical display unit. After passing through a polarizing means and a means for controlling the angle of polarization, the external incident light is broken down into its color components through refraction and/or diffraction. After that, the color components obtained are selectively reflected back in the direction of external incident light by individual elements (pixels) of the display unit.

LIST OF REFERENCE NUMBERS

| | |
|---|---|
| 12 | linear polarizer |
| 14 | support plate |
| 16 | liquid crystal element |
| 18a, 18b, 18c ... | top electrodes |
| 20a, 20b, 20c ... | liquid crystal cells |
| 22a, 22b, 22c ... | bottom electrodes |
| 24a, 24b, 24c ... | spacers |
| 26 | color-selective matrix |
| 28a, 28b, 28c ... | color-selecting elements (dichroic prisms) |
| 32 | support structure |
| 34a, 34b, 34c, 34d | display pixels (blue, green, red, colorless) |
| 36 | external light |
| 36a, 36b, 36c, ... | color components of external light (blue, green, red, etc.) |
| 38 | reflecting surface |
| 39 | color-selective surface |
| 40 | linear polarizer |
| 42 | diffraction grating |
| 44 | reflecting surface |
| V | LCD control voltage source |

SIDE VIEW OF COLOR SCREEN—FIG. 1

Figure 1:
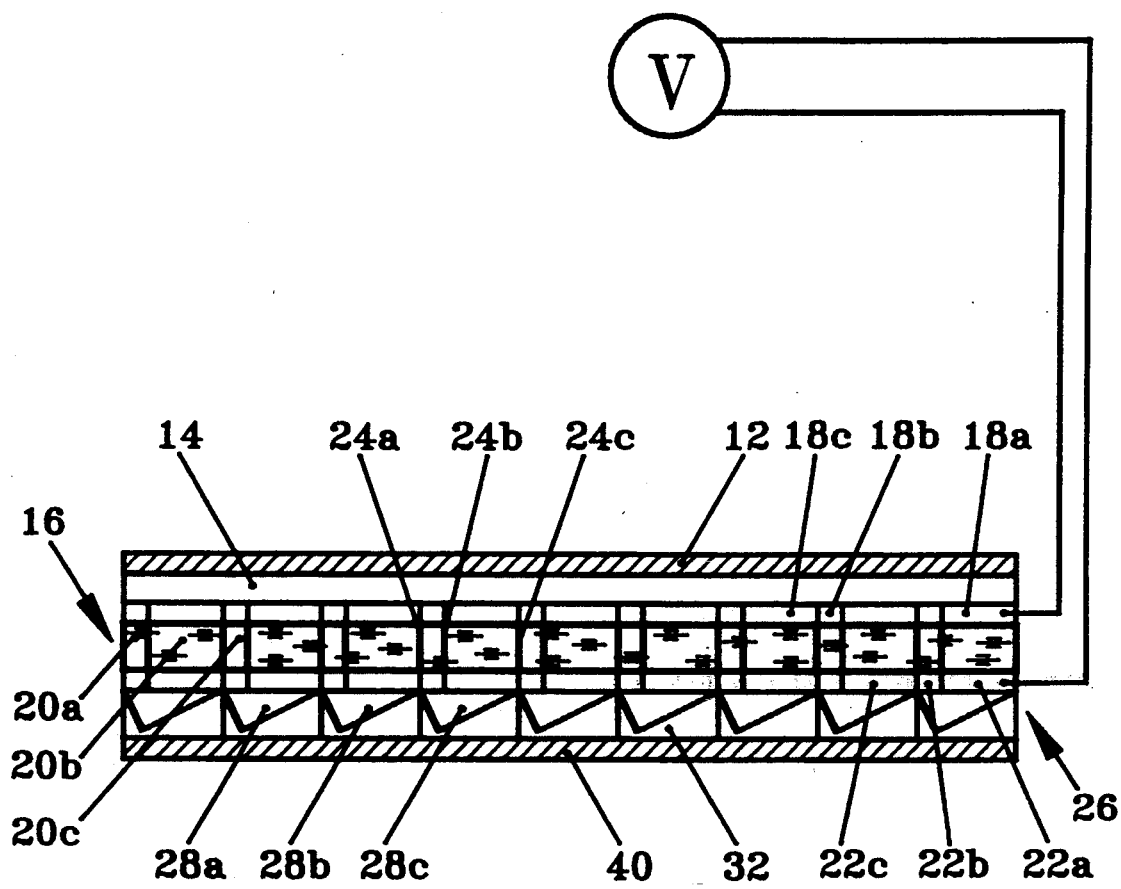
FIG. 1 is a side view of a full-color display unit according to the invention.

Since full-color screens are of major interest, the preferred embodiment is based on an optical color display unit as shown in a side view in FIG. 1.

A display unit consists of a linear polarizer plate 12, which is located on the outside surface of the display unit and covers the entire viewing area of the display. Polarizer 12 is made of glass or thin film polymeric plastic and exhibits a thickness of 0.1 to 3.5 mm.

The next layer is a transparent support or reinforcement plate 14, which can be made of glass or a suitable plastic affording the desired degree of dimensional stability. The reinforcement plate has the same surface area as the display screen. Preferably, the thickness of reinforcement plate 14 should be comprised between 0.1 and 10.0 mm. An LC element 16 is located below reinforcement plate 14. In general, LC element 16 consists of top electrodes 18a, 18b, 18c, etc., and bottom electrodes 22a, 22b, 22c, etc. These may exhibit the form of thin-film electrodes of indium-tin oxide commonly used for such purposes, and may range in thickness from 5 to 20 $\mu$m. Top electrodes 18a, 18b, 18c, etc. and bottom electrodes 22a, 22b, 22c, etc. are individually connected to an LCD control voltage source V and electronic steering devices which may include processors and/or central processing units (not shown) for applying appropriate voltages to individual cells 20a, 20b, 20c, etc. of element 16. It will be obvious to those skilled in the art how to design the circuits including proper control means to enable appropriate multiplexing of the voltages applied to LC cells 20a, 20b, 20c, etc. Spacers 24a, 24b, 24c, etc. are provided to delimit and separate individual liquid crystal cells 20a, 20b, 20c, etc. from each other and to offer the necessary mechanical support. These spacers are made of a polymer, such as polyvinyl film or glass fiber, and are preferably about 2 to 20 $\mu$m thick.

The individual LC cells may vary in size, but are preferably about 160 $\mu$m$^2$, as found in typical color display screens. However, the size of the LC cells may also be much larger, as required for special applications using very large screens. The surface area of the entire screen may range from 60 mm$^2$ or less up to 100 m$^2$, or even more.

Underneath LC element 16 is situated a color-selective matrix 26 comprising a plurality of color-selecting elements 28a, 28b, etc. In the preferred embodiment of the invention the color-selecting elements comprise dichroic prisms 28a, 28b, etc. which are made of optical material such as glass or plastic. Their base (pixel) dimensions are comprised between 100 $\mu$m$^2$ and 250 cm$^2$ and their height can range from 8 $\mu$m to 6 cm.

Color-selective matrix 26 is wedged in a transparent support structure 32, which may be made of molded plastic, as in the case of reinforcement plate 14. The surface area of support structure 32 corresponds to the size of the display screen. Its thickness must exceed the height of dichroic prisms 28a, 28b, etc. by at least 100 $\mu$m, and should preferably be comprised between 100 $\mu$m and 10 cm. Also, the refractive index of support structure should be as close to 1 as possible, but at least significantly lower than the refractive index of dichroic prisms 28a, 28b, etc.

A voltage from an LCD voltage source V is selectively applied across electrodes 18a, 18b, 18c and electrodes 20a, 20b, 20c. Voltage source V, which is not a part of the invention, may be chosen from among DC sources commonly used for changing the alignment of nematic crystals in LCDs.

Finally, a linear polarizer 40 is situated below support structure 32. This linear polarizer has the same dimensions and properties as polarizer 12, and its axis of polarization is aligned along the polarization axis of polarizer 12.

SIDE VIEW OF COLOR-SELECTING ELEMENT—FIG. 2

Figure 2:
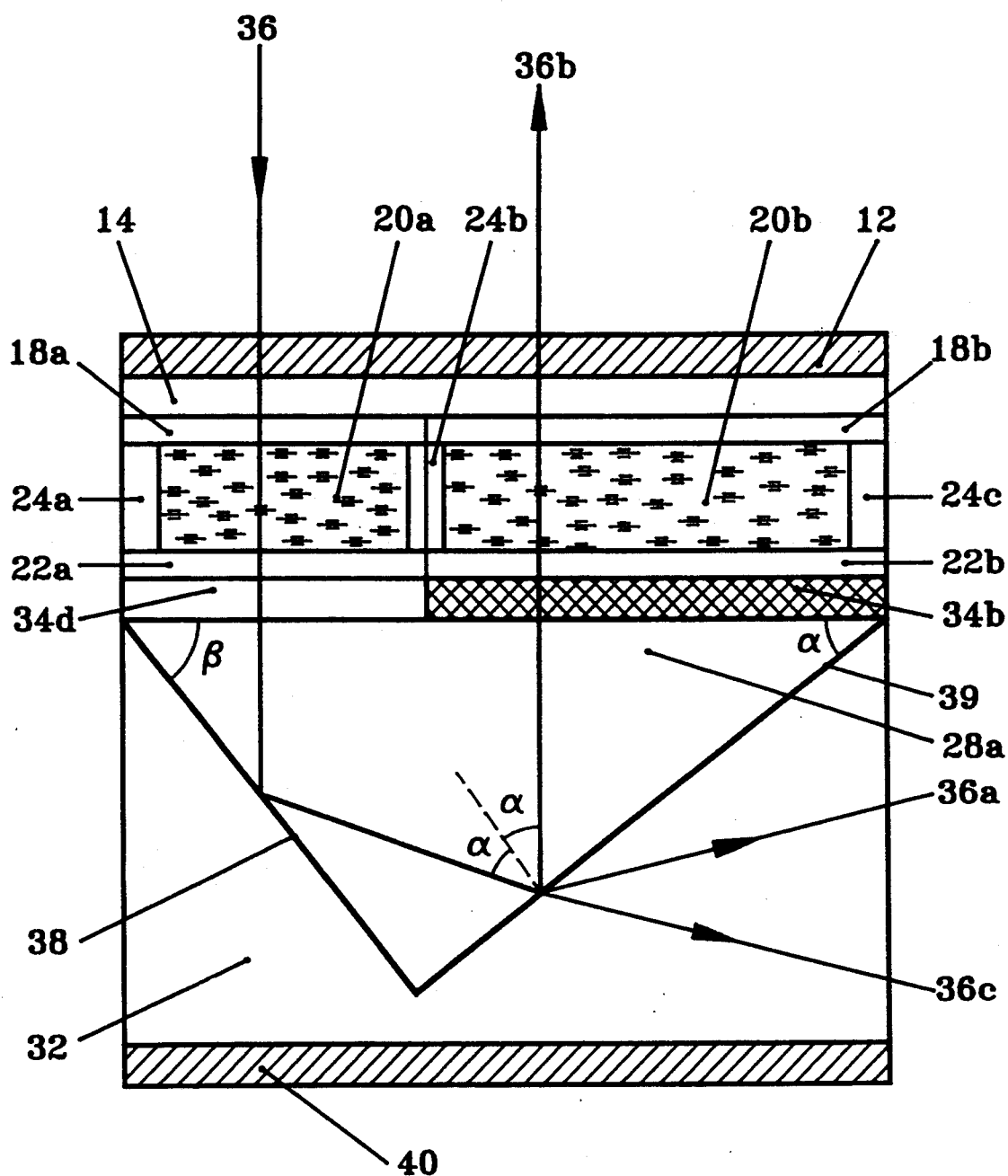
FIG. 2 is a schematic view of a single color-selecting element (dichroic prism) of the full-color display unit in FIG. 1.

FIG. 2 illustrates a single color-selecting element 28a of color-selective matrix 26. In the preferred embodiment color-selecting element 28a is represented by a dichroic prism made of a highly refractive material, e.g., acrylic. Dichroic prism 28a has interior angles $\alpha$ and $\beta$. Angle $\beta$ is sufficiently large, e.g., about 70°, to ensure that a reflecting surface 38 of dichroic prism 28a exhibits significant inclination with respect to the horizontal. This ensures that light 36 entering dichroic prism 28a will impinge upon reflective surface 38 at angle $\beta$, which is larger than the critical angle for total internal reflection. If necessary, reflecting surface 38 may be additionally provided with a conventional reflective coating to further improve its reflective quality.

In the preferred embodiment angle $\alpha$ is correspondingly smaller, e.g., 20°, and ensures that the inclination of a color-selective surface 39 with respect to the horizontal is sufficiently small. This ensures that the angle of incidence of light 36 at a color-selecting surface 39 is less than the critical angle for internal reflection. Alternatively, angle $\alpha$ can correspond to values at which individual color components 36a, 36b, 36c, etc. of light 36 meet the refraction condition at color selective surface 39. In this particular arrangement blue color light 36a undergoes refraction at 36°54′, green color light 36b at 37°42′, and red color light 36c at 38°.

Color-selecting surface 39 is coated with a color-sensitive reflective coating (e.g., reflective coatings produced by Optical Coating Laboratory, Inc.). Such coatings typically have a reflective spectrum width of about 40 nm and a reflectivity up to 99%. Since dichroic prism 28a is tuned for green color light 36b the color-sensitive coating on surface 39 is chosen to reflect wavelengths corresponding to green light only. Any other color component of light 36 will satisfy the refraction condition at surface 39.

The base of dichroic prism 28a is oriented parallel to the screen surface and is visible to the viewer's eye. This base is subdivided into display areas or pixels 34d and 34b.

Display pixel 34b of dichroic prism 28a is tinted with green dye while display pixel 34d is completely colorless or transparent. The dyes may be chosen from among commercially available products, such as dyes for lasers (e.g., Blue 7410D2867, Green 7410D26354, and Red 74101333 manufactured by Reusche, Drakenfeld & Hancock), and they can be applied using such methods as photolithography or printing.

TOP VIEW OF AN ARRANGEMENT OF COLOR CELLS (PIXELS)—FIG. 3

Figure 3:
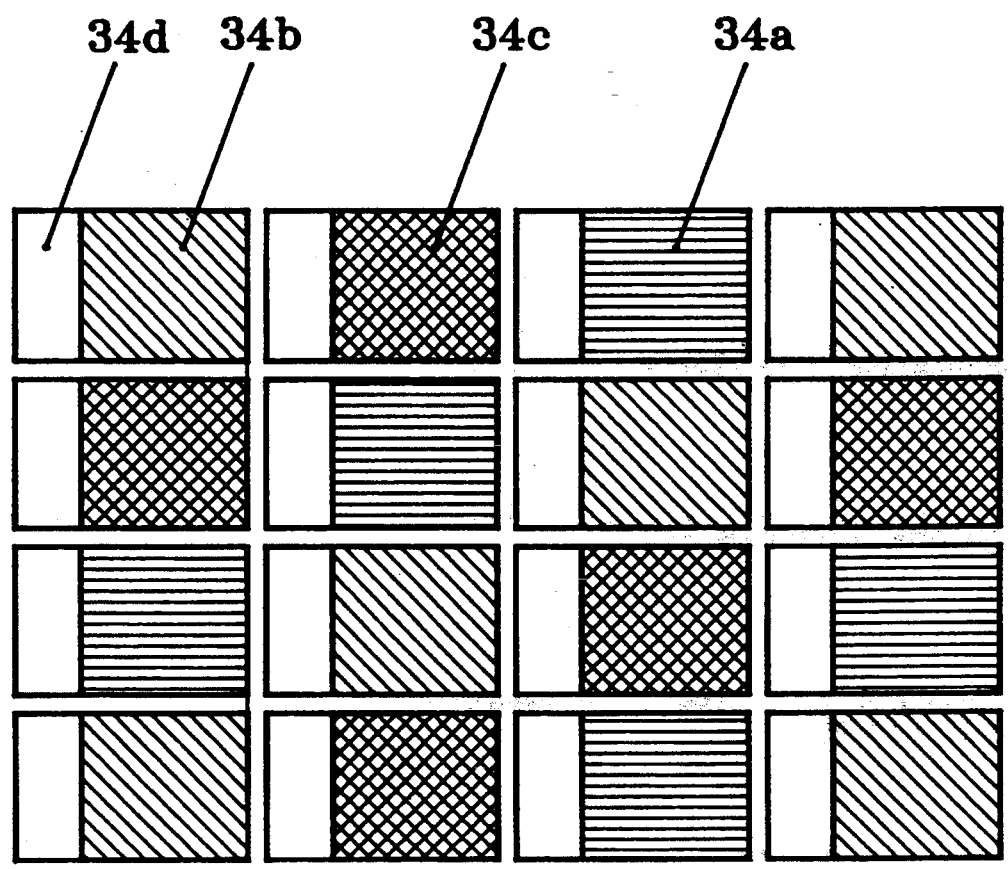
FIG. 3 is a top view of the arrangement of color cells (pixels) of the optical color display unit in FIG. 1.

FIG. 3 illustrates the color matrix as seen when viewing color-selective matrix 26 from the top. In a preferred embodiment individual display pixels 34a, 34b, 34c, 34d of dichroic prisms 28a, 28b, 28c, etc. are arranged to form a checkerboard pattern with the three basic colors, red, blue, green, located adjacent to colorless fields. In this geometric arrangement, each basic color is located adjacent to the other basic colors. As a result of such distribution of color among pixels 34, the viewer's eye will not be able to detect any discontinuities in the image displayed.

The size of the color and colorless pixels may vary, depending on the typical viewing distance. For small screens, e.g., display screens of lap-top computers, the pixel size is typically 100 $\mu m^2$, while in large screens, e.g., announcement boards etc., the pixel sizes may reach 100 to 250 $cm^2$.

OPERATION OF THE PREFERRED EMBODIMENT

The operation of the color optical display from FIG. 1 will be best understood by initially considering dichroic prism 28a of FIG. 2.

Incident external light 36 originating from the surroundings generally contains the entire spectrum of color components. These color components include, among others, the three basic colors: blue 36a, green 36b, and red 36c. Light 36, enters the display unit through polarizer 12. Due to the linear nature of polarizer 12, the white light which manages to pass through is linearly polarized along the transmission axis of the polarizer. Plane polarized light 36 then passes through support plate 14 and transparent electrode 18a into LC cell 20a.

As is well known to one skilled in the art, to control the state of LC cell 20a a voltage is applied from LCD voltage source V to electrodes 18a and 22a. When low voltage (zero voltage) is applied to electrodes 18a and 22a, the direction of polarization of light passing through cell 20a is rotated by a set angle with respect to the polarization of polarizer 12. In this case the angle of rotation is 90°.

On the other hand, applying a high voltage in excess of a predetermined threshold, e.g. from 2 to 3 Volt, will ensure that light components 36 will pass through cell 20a without experiencing any changes in their polarization, i.e., their polarization will correspond to that selected by polarizer 12.

Once light 36 emerges on the other side of LC cell 20a and passes through transparent electrode 22a, it enters dichroic prism 28a through colorless display pixel 34d. In passing through prism 28a light 36 is reflected at reflecting surface 38, because its angle of incidence $\beta$ is larger than the critical angle for internal reflection.

After being reflected light 36 impinges upon color-selective surface 39. In dichroic prism 28a, which is tuned for green light 36b, only green color light 36b is reflected by the color-sensitive reflective coating provided on surface 39. All other color components of light 36, including the other two basic color components 36a and 36c are refracted into support material 32 and absorbed. In leaving prism 28a, green light 36b passes through green display pixel 34b, and thus green light 36b becomes reinforced, so as to appear more green to the viewer's eye. Green face portion 34b also acts to filter out any stray light other than green.

After passing through electrode 22b, green light 36b enters LC cell 20b. Depending on the voltage applied to electrodes 18b and 22b, the polarization of green light 36b may be rotated by an additional 90° angle to produce a total rotation of 180°, or remain unchanged, thus preserving the original 90° rotation. In the former case, green light 36b will oscillate along the same optical axis as upon its initial passage through linear polarizer 12, and will thus be able to exit through polarizer 12 after first passing through support plate 14. However, if a voltage exceeding the threshold value is applied across electrodes 18b and 22b, then green light 36b will preserve its prior polarization, which is at 90° to the polarizing axis of polarizer 12. Consequently, cell 20b will appear dark to the viewer.

By suitably controlling all electrodes 18a, 18b, 18c, etc. and 22a, 22b, 22c, etc. it is possible, according to the principle described above, to control the passage of light through all dichroic prisms 28a, 28b, 28c, etc. (FIG. 1). Since dichroic prisms 28a, 28b, 28c are tuned for selecting red 36a, green 36b, and blue 36c color components from light 36 respectively, they are capable of spanning an area in color space. This enables generation of color images and/or data on the color display screen. Moreover, the image is produced using external light only, thus eliminating any need for special light sources, power supplies, etc. In addition, the brightness of color display will automatically adjust itself, depending on the intensity of incident light, thus ensuring good image quality.

Also, if so desired, the entire process can be reversed to provide for incident light 36 to be first transmitted through linear polarizer 40 and then color selected at surface 39. This permits the use of external light coming from behind the screen, or of a light source positioned behind the screen (not shown). Such an arrangement requires appropriate selection of angles $\alpha$ and $\beta$.

EMBODIMENT OF ANOTHER COLOR-SELECTING ELEMENT—FIG. 4

Figure 4:
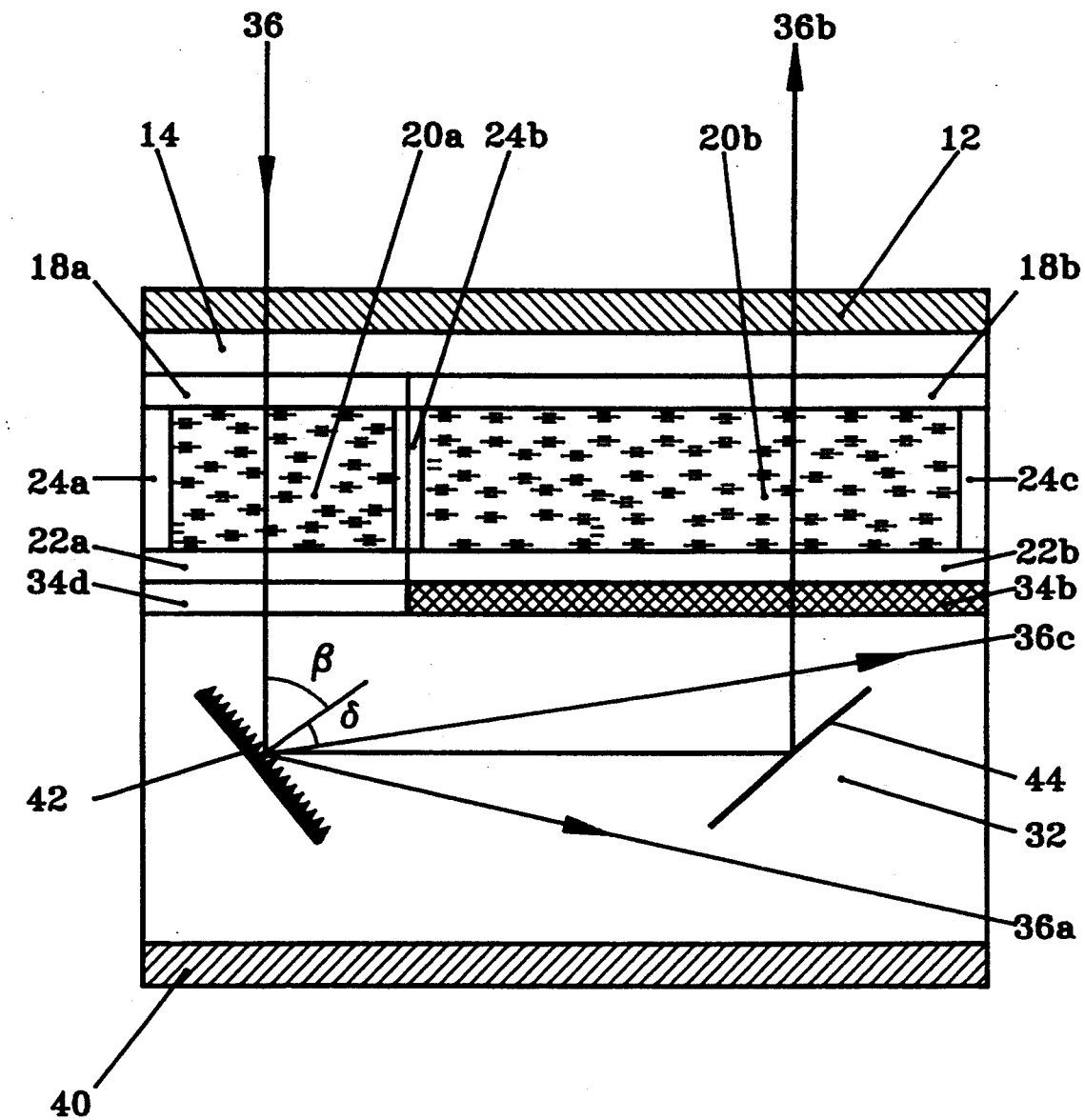
FIG. 4 is a schematic view of a different color-selective element (diffraction grating) in another embodiment of the invention.

According to another preferred embodiment of the invention color-selecting elements 28a, 28b, 28c, etc. in color-selective matrix 26 can be replaced by another color-selecting element 42 in the form of a diffraction grating. Opposite diffraction grating 42 is positioned a reflective surface 44 as shown in FIG. 4. Grating surface 42 exhibits a diffracting grid spacing from 2 to 4 $\mu$m and a surface area between 50 $\mu$m$^2$ and 100 cm$^2$. The surface area of reflective surface 44 is comprised between 200 $\mu$m$^2$ and 400 cm$^2$.

Light diffracted by the grating obeys the general formula $$t(\sin\beta + \sin\delta) = k\lambda$$

in which t is the grid spacing, $\beta$ is the angle of incidence, $\delta$ is the reflected angle, $\lambda$ is the wavelength of light, and k=0, 1, 2, ... This invention only deals with first order diffracted light at k=1. Thus the above equation reduces to:

$$t(\sin\beta + \sin\delta) = \lambda$$

With the grating parameters indicated above, grating 42 is inclined at $\beta = 80°$ to ensure that light 36 is incident at 80°. According to the equation, the color components 36a, 36b, 36c will be diffracted at 22.9°, 14.9°, and 7° respectively.

OPERATION OF EMBODIMENT WITH DIFFRACTION GRATINGS

The operation of this embodiment is analogous to the operation of the embodiment described above. After passing through LC cell 20a, bottom electrode 22a, and colorless pixel 34d light 36 enters support material 32. Passing through the latter light 36 arrives at diffraction grating 42 where diffraction takes place according to the conventional formula explained above.

After being diffracted, color components 36a, 36b, 36c diverge and travel toward reflecting surface 44. As the arrangement in FIG. 4 is tuned for selecting green light 36b, only the latter falls on reflecting surface 44 and is reflected back towards the display surface. Meanwhile, all other color components including 36a and 36b are absorbed in support material 32. Of course, the display unit is made of cells with diffracting elements 42 and reflecting surfaces 44 tuned for all basic colors, as discussed above.

TOP VIEW OF ANOTHER PREFERRED ARRANGEMENT OF COLOR CELLS (PIXELS)—FIG. 5

Figure 5:
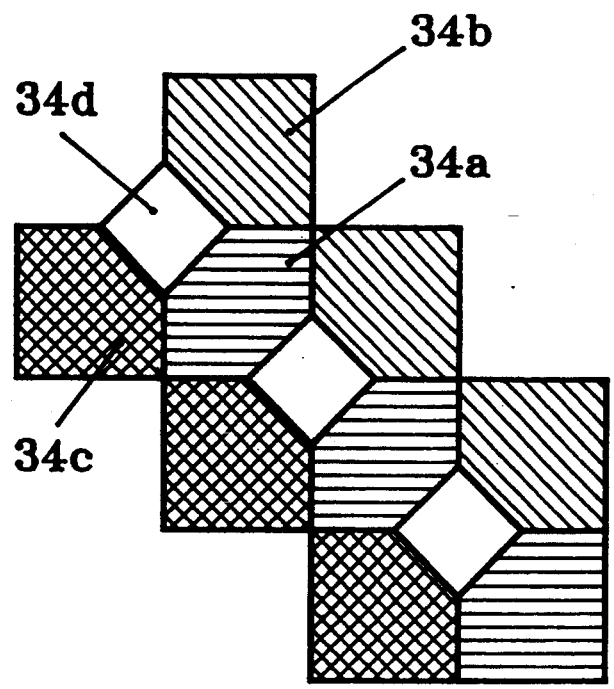
FIG. 5 is a top view of another possible arrangement of color cells of an optical color display unit according to the invention.

Meanwhile, it is also possible, within the scope of invention, to chose a color pixel pattern other than that illustrated in FIG. 3. FIG. 5 illustrates another advantageous geometrical arrangement of color pixels. Again, just as in the checkerboard pattern, the color pixels are situated adjacent to each other and the colorless pixel is situated in the middle.

In general, many geometrical arrangements of color and colorless pixels are possible. Depending on the desired visual effect, the shapes and/or spatial arrangement of color-selecting elements 28a, 28b, 28c, and 42 can be changed. For example, the entire structure of the color-selective matrix could be altered such that the pixels exhibit the shape of prisms with polygons or any other planar figures.

It should be noted that color components 36a, 36b, 36c can also pass through the entire structure of the color optical display unit in reverse order. This requires that angles $\alpha$ and $\beta$ be adjusted accordingly.

The optical display designed in this way can be used to show any visual data. Among the many devices which can be equipped with such optical display units are computers, electronic devices with visual read-off screens, television sets, large viewing screens, etc. The natural incident light in any of the above application may be replaced by a suitable artificial source of light, e.g., fluorescent or tungsten lamps.

In general, any surface and/or material traversed by light ray 36 can be tinted or colored to reinforce the color effect. Thus, for example, the optical display can exhibit tinted parts and/or surfaces other than dichroic prisms 28a, 8b, 28c and their display pixels 34a, 34b, 34c, 34d. In fact, the individual support layers 14, 32 and/or polarizer 12 and/or electrode layers 18 and 22 can be tinted to achieve the desired color reinforcement effect.

In addition, the color-selective matrix 26 of the optical display can be tuned for generating any combination of colors other than red, green, and blue. In certain conditions more than three colors can be employed to produce the desired colors on the screen surface. Understandably, in such a case the geometrical angles of color-selecting elements will have to be varied accordingly.

Finally, if so desired, one can also illuminate and operate the optical display unit when no external light is present. This is achieved by placing a conventional background light source (not shown) behind polarizer 40, and operating the display as a conventional LC display. Of course, in this case the advantage of versatility eliminates the other advantages ensured by color optical display according to the invention.

By virtue of using external light the optical color display described above eliminates the disadvantages of conventional display screens. By doing without an internal light source the display screen can be made very thin, versatile, robust, and easy to view at off-normal angles. Most importantly, however, such a display screen does not require any power supplies. Also, using external light ensures better image quality and automatic adjustment of screen brightness, depending on prevailing external conditions.

SUMMARY, RAMIFICATIONS, AND SCOPE

Thus, it has been shown that we have provided an optical display unit which uses external light for illumination and operation by breaking it up into individual color components through refraction and/or diffraction and reflecting back only the desired color component.

Although the optical display unit has been shown and described in the form of two specific embodiments, their parts, materials, and configurations are given only as examples, and many other modifications of the apparatus are possible. For example, it is possible to reinforce the refracted and/or diffracted and selectively reflected color components by using materials other than tinting dyes. In theory, any material in the path of light ray 36, which is to be refracted and/or diffracted to select a certain color, may be tinted or coated with that color.

Moreover, instead of using dichroic prisms or diffractions gratings any other optical elements, e.g. Fresnel biprisms, can be used to break down the incident light into its color components. Furthermore, it is possible to use more, fewer, or even different color components than the three basic colors suggested. For example, the principles of the invention can be applied to create a two-color display using external light for illumination and operation. Therefore, the scope of the invention should be determined, not by examples given, but by the appended claims and their legal equivalents.

I claim:

1. An optical display unit using external light having a direction of propagation, said light having a plurality of color components for illumination and operation, comprising the following elements arranged sequentially in said direction of propagation:
   polarizing means for polarizing said external light along a predetermined axis;
   means for controlling the angle of polarization of said polarized light, said means comprising a plurality of pairs of individually-controlled cells, each pair consisting of a first cell and a second cell; and
   means for selectively reflecting a plurality of predetermined color components of said polarized light, after said polarized light passes through either said first cell or said second cell of said pair, and for selectively passing said selectively reflected predetermined color components through the other cell of said pair in a direction opposite to said direction of propagation.

2. The optical display unit of claim 1 wherein said means for selectively reflecting comprises a dichroic prism.

3. The optical display unit of claim 2 wherein said polarizing means comprises a polarization plate.

4. The optical display unit of claim 3 wherein each of said cells comprises a liquid-crystal cell and a Fair of control electrodes sandwiching said liquid-crystal cell, and further including means for intensifying said color components of said polarized light prior to passing through said other cell, said means for intensifying comprising a plate divided into a plurality of sections, each of which corresponds to a respective one of said liquid-crystal cells and which comprises a first section which is located directly under one cell of said pair and a second section which is located directly under said other cell of said pair, said other section being tinted a color corresponding to said predetermined color component.

5. The optical display unit of claim 1 wherein said means for selectively reflecting said polarized light comprises a diffraction grating.

6. The optical display unit of claim 5 wherein said polarizing means comprise a polarization plate.

7. The optical display unit of claim 6 wherein each of said cells comprises a liquid-crystal cell and a pair of control electrodes sandwiching said liquid-crystal cell.

8. The optical display unit of claim 7, further including means for intensifying said predetermined color components prior to passing through said other cell, said means for intensifying comprising a plate divided into a plurality of sections, each of which corresponds to a respective one of said liquid-crystal cells and which comprises a first section which is located directly under one cell of said pair and a second section which is located directly under said other cell of said pair, said other section being tinted a color corresponding to said selected color component.

9. The optical display unit of claim 1, further including a background light source arranged to illuminate said optical display unit.

10. An optical display unit using external light, which consists of color components for illumination and operation, comprising the following elements arranged sequentially in the direction of propagation of said external light:
    a polarizing plate for polarizing said external light along a predetermined axis;
    an active matrix for controlling the angle of polarization of said polarized light, said matrix comprising a plurality of pairs of individually-controlled cells, each pair consisting of a first cell and a second cell, each cell comprising a liquid-crystal cell and a pair of control electrodes sandwiching said liquid-crystal cell; and
    means for selectively reflecting a plurality of predetermined color components of said polarized light after passing through either said first cell or said second cell of said pair, through the other cell of said pair in a direction opposite to said direction of propagation.

11. The optical display unit of claim 10 wherein said other cell has refracting means for passing a plurality of color components of said light which are different in different pairs of said cells, said optical display unit further including means for intensifying said predetermined color components, prior to passing through said other cell, said means for intensifying comprising a plate divided into a plurality of sections, each of which corresponds to said liquid-crystal cells and comprises a first section which is located directly under one cell of said pair and a second section which is located directly under the other cell of said pair, said second section being tinted a color corresponding to said predetermined color component.

12. The optical display unit of claim 10 wherein said means for selectively reflecting said predetermined color components of said polarized light comprises a diffraction grating.

13. The optical display unit of claim 12 wherein said other cell has refracting means for passing said predetermined color component of said polarized light, said reflecting means selecting a different color component to pass through said other cell in different pairs of cells.

14. The optical display unit of claim 13, further including means for intensifying said predetermined color components prior to passing through said other cell, said means for intensifying comprising a plate divided into a plurality of sections, each of which corresponds to a respective one of said liquid-crystal cells and comprises a first section which is located directly under one cell of said pair and a second section which is located directly under the second cell of said pair, said other section being tinted a color corresponding to said predetermined color component.

15. A method for illuminating and operating an optical display trait comprising the steps of:
    passing an external light, having a direction of polarization and which consists of a plurality of color components, through polarization means for polarizing said external light along a predetermined axis;
    controlling the angle of polarization of said polarized light;
    selectively reflecting a plurality of predetermined color components of said polarized light to provide a plurality of reflected predetermined color components; and
    selectively passing said reflected predetermined color components of said polarized light through said optical display unit in a direction opposite to said direction of propagation.

* * * * *

UNITED STATES PATENT AND TRADEMARK OFFICE
CERTIFICATE OF CORRECTION

PATENT NO. : 5,432,624
DATED : July 11, 1995
INVENTOR(S) : Michael Black

It is certified that error appears in the above-indentified patent and that said Letters Patent is hereby corrected as shown below:

Column 9, line 30, change "Fair" to --pair--.

Signed and Sealed this

Twenty-sixth Day of September, 1995

Attest:

BRUCE LEHMAN

*Attesting Officer*      *Commissioner of Patents and Trademarks*